(12) United States Patent
Bedi

(10) Patent No.: US 6,896,014 B1
(45) Date of Patent: May 24, 2005

(54) METHOD AND APPARATUS FOR REMOVING TRANSMISSION FLUID FROM FLUID RESERVOIR AND ASSOCIATED FLUID COOLER WITH OPTIONAL FLUID REPLACEMENT

(76) Inventor: Ram D. Bedi, 6058 Wing Lake Rd., Bloomfield Township, MI (US) 48301

( * ) Notice: Subject to any disclaimer, the term of this patent is extended or adjusted under 35 U.S.C. 154(b) by 0 days.

(21) Appl. No.: 10/730,462

(22) Filed: Dec. 8, 2003

Related U.S. Application Data
(60) Provisional application No. 60/432,132, filed on Dec. 9, 2002.

(51) Int. Cl.[7] .............................................. B65B 1/04
(52) U.S. Cl. ......................................... 141/65; 184/1.5
(58) Field of Search ............................. 141/65, 66, 98, 141/59; 184/1.5

(56) References Cited

U.S. PATENT DOCUMENTS

| | | | |
|---|---|---|---|
| 5,454,355 A | 10/1995 | van der Griendt | 123/196 A |
| 5,676,842 A | 10/1997 | Bedi et al. | 210/739 |
| 5,871,068 A * | 2/1999 | Selby | 184/1.5 |
| 5,900,155 A | 5/1999 | Bedi | 210/739 |
| 6,065,567 A * | 5/2000 | Camacho et al. | 184/1.5 |
| 6,145,622 A * | 11/2000 | Clark, II | 184/1.5 |
| 6,378,657 B2 * | 4/2002 | Viken | 184/1.5 |
| 6,729,364 B2 * | 5/2004 | Few et al. | 141/65 |

* cited by examiner

*Primary Examiner*—Steven O. Douglas
(74) *Attorney, Agent, or Firm*—Young & Basile, P.C.

(57) ABSTRACT

A method and apparatus for removing transmission fluid from the transmission fluid reservoir of a vehicle and the associated fluid cooler with an optional transmission fluid replacement includes a quick connect valve located in the transmission fluid recirculation system positioned upstream from the fluid cooler for selective connection to a source of pressurized air and a source of fresh transmission fluid. The quick connect valve restricts the flow of the pressurized gas and fresh transmission fluid in only one direction to direct the flow of pressurized gas and fresh transmission fluid through the fluid cooler and then to the transmission reservoir. A quick connect valve may be also located in a drain plug of the transmission reservoir for communication to a waste receptacle during the removal of the waste transmission fluid.

14 Claims, 2 Drawing Sheets

METHOD AND APPARATUS FOR REMOVING TRANSMISSION FLUID FROM FLUID RESERVOIR AND ASSOCIATED FLUID COOLER WITH OPTIONAL FLUID REPLACEMENT

This application claims priority of U.S. Provisional Application Ser. No. 60/432,132 filed on Dec. 9, 2002.

FIELD OF THE INVENTION

The invention relates to a method and apparatus for removing at least a portion of waste transmission fluids in an automotive vehicle or similar device and selectively exchanging with fresh transmission fluid.

BACKGROUND OF THE INVENTION

Routine maintenance of a vehicle includes the periodic checking and replenishment of transmission fluid in the vehicle. The transmission fluid lubricates gears employed in the connection between the internal combustion engine and the associated drive shaft for transferring power from the engine to the drive shaft of the vehicle or powertrain. Transmission fluid is lost, reduced, or degraded over time. Additionally, metallic particles can accumulate in the transmission fluid which contribute to abrasive wear of the gears, especially powertrains that operate in dusty environments. Replenishment of the transmission fluid and removal of contained particulate material can prolong the life of the transmission and improve its performance. Changing of transmission fluid can present many of the same problems of time, expense, and environmental safety that are presented with lubricating oil changes. Additionally, given the design of most transmission systems, accomplishing transmission fluid removal and replacement in a clean and efficient manner is problematic at best.

Therefore, it would be desirable to provide a system which reduces the amount of waste fluid handling and exposure as well as the risk of environmental damage due to spills and the like during fluid transfer. It would further be desirable to provide a method which could be easily employed at locations convenient to the typical location of the vehicle or powertrain to be serviced with benefits such as time savings, money savings, convenience, minimum exposure to spent or fresh fluid, environmental protection, energy conservation, and longer lasting, better performing vehicles and sub-components.

SUMMARY OF THE INVENTION

It is the intent of the present invention to address the aforementioned issues.

An aspect of the invention includes an apparatus for changing the transmission fluid in a transmission having a transmission fluid reservoir. The apparatus includes at least one receptacle for spent transmission fluid, and at least one container for holding a supply of replacement transmission fluid. The apparatus for changing transmission fluid includes a valve upstream from the transmission cooler in the transmission recirculation system to facilitate the removal of waste fluid from the transmission fluid reservoir and introduce clean transmission fluid into the vehicle.

The invention further includes the method of changing the transmission oil in an engine including the steps of attaching a waste transmission fluid hose for withdrawing the transmission fluid from the engine, attaching a purge gas supply hose for supplying compressed gas to the engine, and purging the transmission passages of transmission fluid and draining the transmission fluid from the transmission reservoir.

The process further includes removing the transmission fluid filter and replacing a new transmission filter on the engine. Following replacement of the transmission fluid filter, filling the transmission with new transmission fluid is performed by metering the fluid through a transmission fluid supply hose. This provides changing of transmission fluid in a close system in an environmentally responsible manner and also with the safety to the operator to eliminate his exposure to hazardous used transmission fluid.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
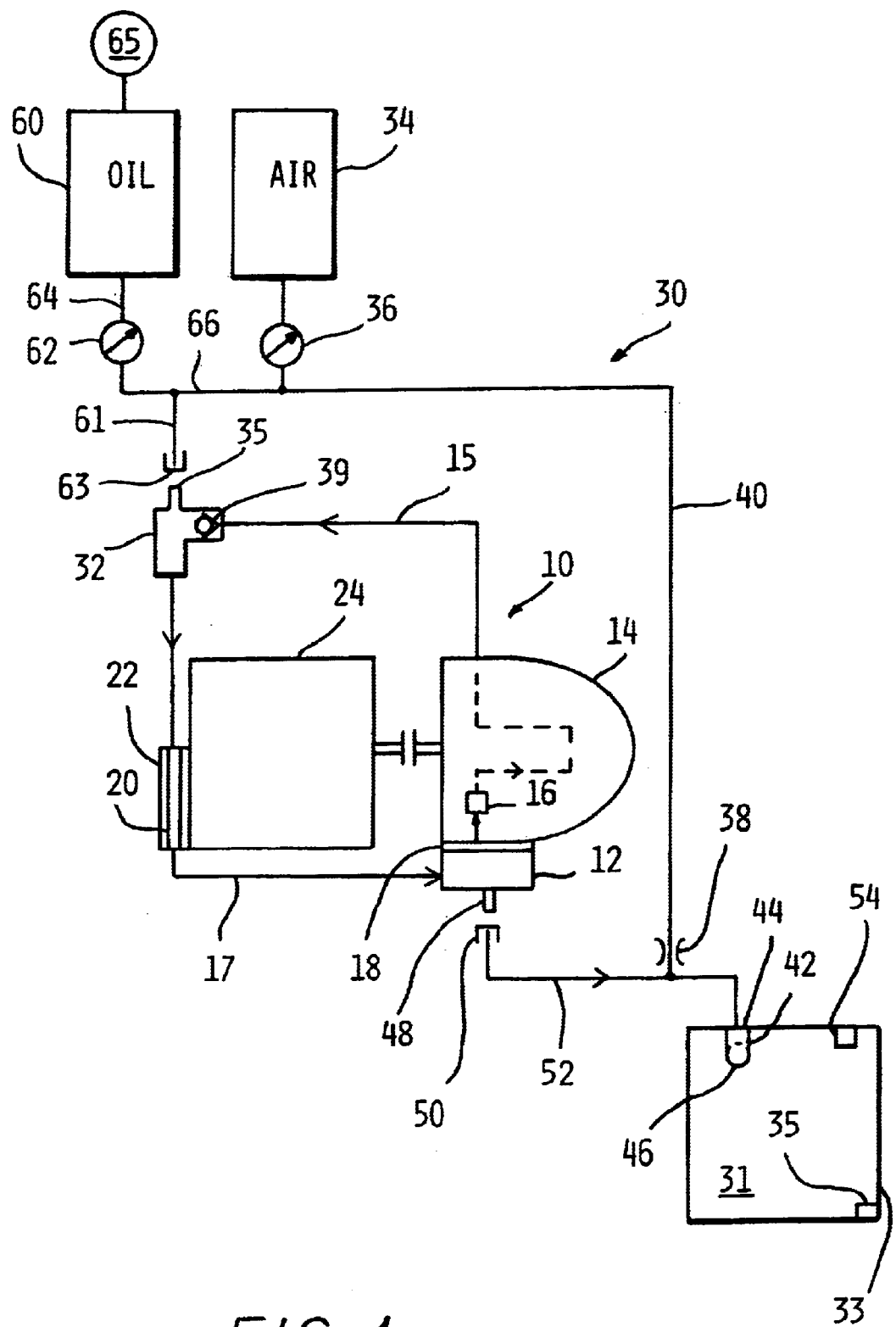
FIG. 1 is a diagram of the apparatus for changing the transmission fluid in an internal combustion engine with a transmission.

As shown in FIG. 1, the present invention includes a transmission oil changing apparatus which is separable from the transmission of an internal combustion engine.

A typical transmission hydraulic system 10 maintains the transmission oil in a reservoir at a low portion 12 of the transmission 14. An oil pump 16 in the transmission 14 pumps the oil through a filter 18 before circulation through the transmission hydraulic system 10. The oil in the transmission 14 can get quite hot. Overheating reduces the transmission performance and can damage the transmission 14. In a typical system, transmission 14 is connected by conduits 15 to an oil cooler tube 20 in the side tank or bottom tank of the radiator 22 of the engine 24. The oil cooler tube 20 is immersed in the cooler coolant in the radiator 22 and is therefore cooled. This cools the transmission oil that then passes through conduit 17 back to the transmission reservoir 12. The cooled transmission fluid then flows for recirculation within the transmission 14.

The changing of transmission fluid in a vehicle is part of routine maintenance. The transmission 14 lubricates gears that connect the internal combustion engine with a drive shaft for transferring power from the engine 24 to the vehicle. Over time, the transmission fluid will accumulate metallic particles that contribute to abrasive wear of the gears. The present invention includes a transmission fluid changing apparatus 30 which is separable from the transmission 14. The transmission fluid changing apparatus 30 as schematically presented in FIG. 1, provides for changing of transmission fluid from the transmission 14. The transmission changing device 30 includes a conduit 61 for connection to the transmission hydraulic system on a vehicle to be serviced, and another conduit 52 for connection to the transmission oil reservoir 12.

To facilitate the changing of transmission fluid in a vehicle, an adapter 32 may be used that provide access to the transmission hydraulic system 10 upstream from the transmission fluid cooler 20. The adapter 32 preferably includes a T-valve 32 for disposing in line within the transmission hydraulic system 10 preferably upstream to the transmission cooler 20. However, it is envisioned that at some point and time manufacturers may modify the configuration of transmission hydraulic system to provide the appropriate coupling connections as required for the present invention as original equipment manufacturers optional, or standard equipment. Therefore, the present invention does not require the T-valve 32 disclosed in this application, but rather only requires a coupling connection 32 capable of effecting the removal of the transmission oil and the replenishment of the transmission oil in fluid communication with the transmission cooler 20 and transmission oil pan reservoir 12. The transmission fluid changer apparatus 30 is releasibly connectable to the coupler connection 32 via conduit 61 having a quick connector 63. The coupling connection 32 has a quick disconnect coupler 35 of a type disclosed in U.S. Pat. No. 5,588,502 and herein incorporated by reference for connection to the connector 63.

Referring to FIG. 1, the transmission oil removal apparatus 30 of the present invention includes a waste transmission oil collection container 33. The transmission oil removal apparatus 30 also includes a connection to a source of pressurized air or general shop air 34. When removing the waste transmission oil, pressurized air is forced through the transmission hydraulic system 10. During the removal of the waste transmission oil from the transmission hydraulic system 10, conduit 61 is connected to coupling connection 32 at the quick disconnect coupler 35; and conduit 40 is disposed in waste container 33. Pressurized air may be forced through coupling connection 32. Connection to the source of pressurized air may be controlled by appropriate valves 36 for opening and closing the communication of the pressurized air with the transmission oil removal apparatus. The transmission oil changing apparatus may include a venturi 38 which is connected to the source of pressurized air by way of the conduit 40. The venturi 38 communicates with the interior 31 of the spent transmission oil collection container 33 by way of a check valve 42. The check valve 42 may have a perforated surface 44 which allows air within the interior of the container to be drawn out by the action of the venturi 38 when pressurized air passes therethrough. The perforated surface 44 of the check valve 42 allows air to bypass a check valve ball 46 until the level of the spent transmission oil within the container rises up and causes the ball 46 to engage the check valve 42, thereby stopping further action of the venturi 38 on the interior of the waste container.

The transmission 14 has a transmission oil reservoir 12 provided with the quick disconnect coupling 48. The quick disconnect coupling 48 may be of a type disclosed in U.S. Pat. No. 5,588,502 as disclosed for use on an oil pan of an engine and which is herein incorporated by reference. The quick disconnect coupling 48 is connected to an appropriate coupling 50 by way of a flexible conduit 52. The connection 50 is preferably a swivel connector along the conduit 52 to rotate thereabout for the ease of use. Preferably, the conduit 52 is transparent so that the operator can visually confirm the flow of transmission fluid therethrough from the transmission reservoir 12 in the interior 31 of the collection container 32. It can be seen that when the appropriate control system is utilized to activate the source of air pressure 34 such as the turning on or off of the valve 36 which may be done manually or through other appropriate known on/off valves, pressurized air passing through a venturi 38 creates a vacuum within the interior of the collection container 32 and thereby forces transmission oil to be evacuated at a rapid rate from the transmission oil reservoir 12 via conduit 52. The spent transmission oil collection container 32 may have a vacuum gauge 54 which provides the operator with an indication that the vacuum is still being created inside the interior 31 of the container 32. When the transmission oil is exhausted from the transmission fluid reservoir 12 by way of the aforementioned process, the conduit 40 is connected to atmospheric pressure which results in the loss of vacuum in the container 32. The source of pressurized air may then be terminated and the quick disconnect coupling 50 disconnected to separate the conduit 52 from the transmission fluid reservoir 12.

Once the flow of pressurized purging air has been terminated, the operator can then open the bottom pan of the transmission fluid reservoir 12 and remove the spent filter medium 18 therefrom, without spilling transmission fluid in order to replace the spent filter medium 18 with a new filter medium. Once the filter 18 has been replaced, the bottom pan is sealed to the transmission fluid reservoir 12. After the conduit 52 been disconnected from the transmission fluid reservoir, the on/off valve 36 is closed isolating the venturi 38 and the conduit 40 from communication with the source of pressure. At the same time, a new transmission fluid supply 60 can be provided to the transmission 14.

Although the transmission includes the transmission fluid reservoir 12 with a transmission fluid dipstick (not shown) that extends thereto to the bottom of the transmission fluid reservoir 12 and which provides a means for filling the transmission reservoir 12, the transmission oil removal apparatus 30 offers an alternative and an environmentally safe means for replenishing the transmission oil into the transmission reservoir 12. The fresh transmission oil supply source 60 consists of a reservoir or transmission fluid container 60 which is connected by way of a conduit 64 to a hand operated on/off valve 62, and conduit 66 to conduit 61. It can thus be seen that when pump 65 is actuated, transmission oil from the reservoir 60 will be directed into the valve 32 and through the cooler as represented by the tubes 20 in the radiator 22. The transmission fluid/oil is forced from the cooler 20 and passes to the transmission fluid reservoir 12. A check valve 39 located in the T-valve 32, prevents transmission fluid under pressure into conduit 15 from being directed back into the transmission without first flowing through the cooler 20 and then into the transmission fluid reservoir 12. When the appropriate amount of transmission fluid is added to the transmission reservoir, the pump 65 to the fresh transmission oil supply is deactivated. The appropriate amount of transmission fluid can be determined by viewing the transmission dipstick.

Figure 2:
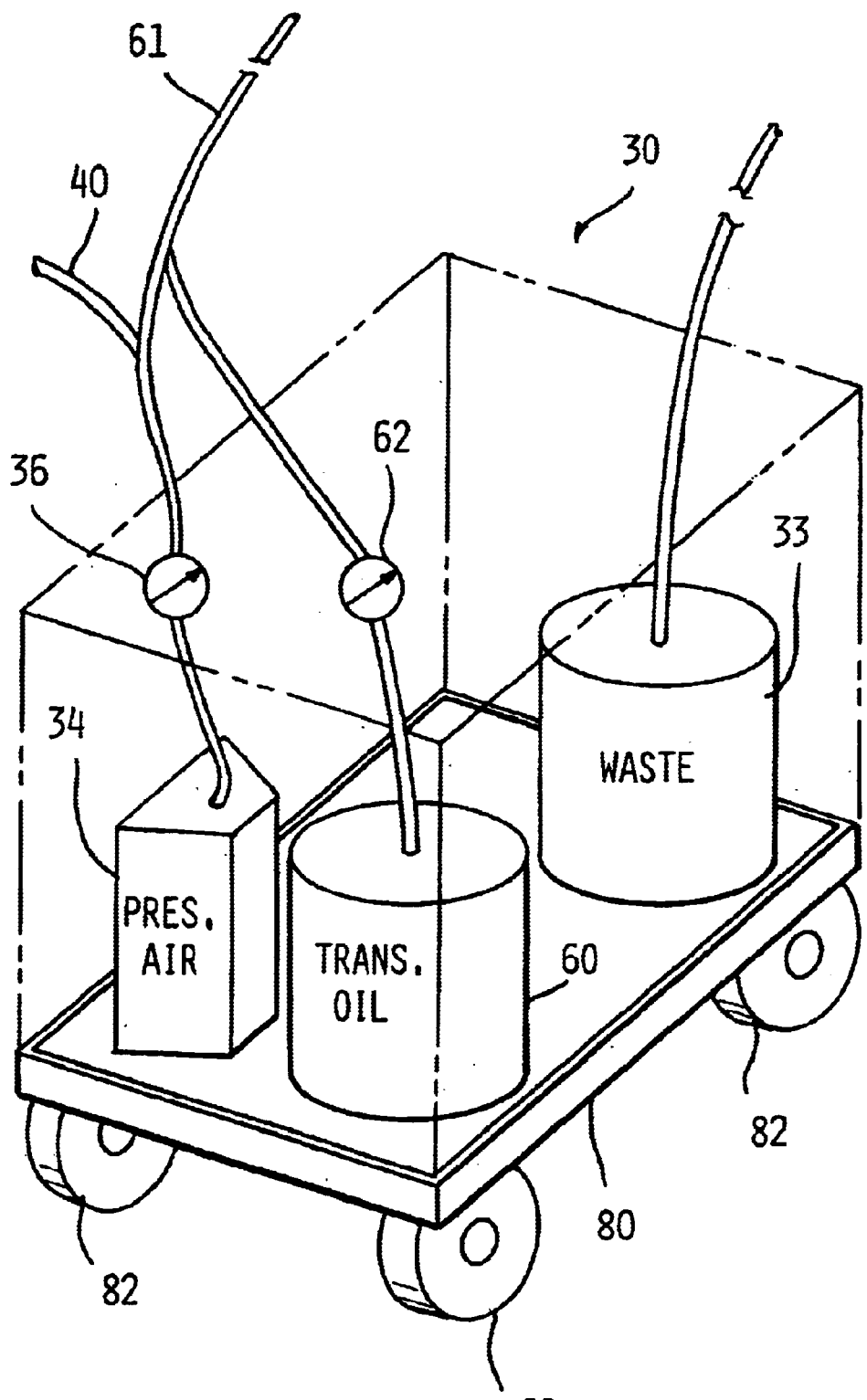
FIG. 2 is a schematic diagram of a transportable device of the present invention.

As shown in FIG. 2, the transmission oil removal apparatus 30 may be contained in a transportable unit 80. In the mobile unit 80, the waste container 33 may become full during the transmission oil changing process. If the waste transmission oil collection container 33 becomes full to the point where the level of spent transmission fluid rises up to the check valve 42 so as to cause the check valve ball 46 to engage the valve opening, it will close the check valve 42 and prevent further communication from the venturi 38. The vacuum in the interior 31 of the container 33 will drop off and the gauge 54 will indicate to the operator that it is time to turn off the source of pressurized air to the venturi 38 and to evacuate the collection container 33. Evacuation from the collection container 33 can be done in a variety of ways. Preferably the conduit 40 is disconnected from the venturi 38 and the conduit 52 is disconnected from the transmission oil pan 12. The mobile unit 80 may be on appropriate wheels 82 and the transmission oil collection container 33 may be moved to a new desirable location. There may be a shut off valve 35 provided at the lower end of the container 33 which may be connected to a suitable drain line which in turn may be connected to a larger storage container (not shown).

Optionally, a suction pump may be utilized and connected to the drain line to force the transmission oil to flow at a greater rate from the interior of the container. Alternatively, a source of pressurized air may be connected via an on/off valve to an inlet at the top portion of the collection container 33. It is evident that when the shut-off valve 35 is opened and pressurized air is forced into the interior, the spent transmission oil within the container 33 will be forced at a greater rate of flow through the shut-off valve and drain line for appropriate disposal. When this arrangement is used, the pump would not be utilized. Check valves connected to the drain line seal the interior of the container drawing this evacuation operation.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. Such modifications can include the use of mechanically operated pumps, electrically operated sensors, and mechanically driven vacuum generating pumps in lieu of the venturi 38. One of the advantages of using the venturi 38 is that the distribution of the pressurized air does not require any electrical devices.

What is claimed is:

1. An apparatus for removing at least a portion of the transmission fluid contained in a vehicle, the vehicle having a transmission mechanism with a transmission fluid circulating system with an associated transmission fluid reservoir, transmission fluid filter and transmission fluid cooler, the apparatus comprising:
   means disposed in the transmission fluid recirculating system for introducing pressurized gas into the system for facilitating the removal of transmission fluid from the transmission fluid reservoir and transmission fluid cooler;
   a waste fluid receptacle for receiving waste transmission fluid;
   means for conveying waste transmission fluid evacuated from the vehicle to the waste fluid receptacle;
   means for introducing fresh transmission oil, including:
      at least one fresh transmission oil supply reservoir; and
      a conduit in fluid communication with the fresh transmission oil supply reservoir, said conduit releasibly engageable in fluid communication with the transmission fluid recirculation system; and
   means for sequentially activating the pressurized gas introduction means for introducing fresh transmission oil.

2. An apparatus for removing at least a portion of the transmission fluid contained in a vehicle, the vehicle having a transmission mechanism with a transmission fluid circulating system with an associated transmission fluid reservoir, transmission fluid filter and transmission fluid cooler, the apparatus comprising:
   means disposed in the transmission fluid recirculation system for introducing pressurized gas to the system for facilitating the removal of transmission fluid from the transmission fluid reservoir and transmission fluid cooler; and
   a waste receptacle for receiving waste transmission fluid;
   wherein the means for introducing a pressurized gas to the transmission fluid recirculating system includes a valve disposed in the transmission fluid recirculating system having one end releasably and selectively connectible to one of a source of pressurized gas and a source of fresh transmission fluid.

3. The apparatus of claim 2, wherein the valve is positioned upstream from the transmission fluid cooler.

4. The apparatus of claim 2, wherein the one end of the valve has a quick connect nipple having a throughbore defining a fluid passageway through the drain opening and wherein the nipple has a means for closing the fluid passageway.

5. The apparatus of claim 2, wherein the valve restricts flow of the pressurized gas and the fresh transmission fluid in only one direction in the transmission fluid circulating system.

6. An apparatus for removing at least a portion of the transmission fluid contained in a vehicle, the vehicle having a transmission mechanism with a transmission fluid circulating system with an associated transmission fluid reservoir, transmission fluid filter and transmission fluid cooler, the apparatus comprising:
   means disposed in the transmission fluid recirculating system for introducing pressurized gas to the system for facilitating the removal of transmission fluid from the transmission fluid reservoir and transmission fluid cooler;
   a waste fluid receptacle for receiving waste transmission fluid;
   means for conveying waste transmission fluid evacuated from the vehicle to the waste fluid receptacle; and
   a quick connect valve in a lower portion of the fluid reservoir for releasible connection to a conduit in fluid communication with the waste fluid receptacle.

7. The apparatus of claim 6, further comprising a venturi valve in the conduit in fluid communication with the waste fluid receptacle.

8. The apparatus of claim 1, wherein the apparatus is transportable on a mobile unit.

9. A method for removing at least a portion of transmission fluid contained in a vehicle, the vehicle having a transmission mechanism with a transmission fluid circulating system with an associated transmission fluid reservoir, transmission fluid filter and transmission fluid cooler, the method comprising the steps of:
   introducing pressurized gas to the system for facilitating the removal of spent transmission fluid from the transmission fluid reservoir and the transmission fluid cooler;
   providing a waste fluid receptacle for receiving the waste transmission fluid;
   introducing fresh transmission oil into the transmission fluid circulating system; and
   wherein the pressurized gas introduction step and the fresh transmission oil introduction step occur sequentially.

10. The method of claim 9, further comprising the step of introducing pressurized gas into the transmission fluid circulating system upstream from the transmission fluid cooler.

11. The method of claim 10, further wherein the fresh transmission oil is introduced into the transmission fluid circulating system upstream from the transmission fluid cooler.

12. A method for removing at least a portion of transmission fluid, contained in a vehicle, the vehicle having a transmission mechanism with a transmission fluid circulating system with an associated transmission fluid reservoir, transmission fluid filter and transmission fluid cooler, the method comprising the steps of:

introducing pressurized gas to the system for facilitating the removal of spent transmission fluid from the transmission fluid reservoir and the transmission fluid cooler;

providing a waste fluid receptacle for receiving the waste transmission fluid;

providing a venturi in a conduit communicating with the waste fluid receptacle for facilitating the removal of spent transmission fluid from the transmission fluid reservoir.

13. The method of claim 11, further comprising the step of providing a fresh transmission oil receptacle.

14. The method of claim 11, further comprising the step of restricting the flow of pressurized gas and fresh transmission oil to only one direction in the transmission fluid circulating system.

* * * * *